United States Patent
Seo et al.

(10) Patent No.: US 7,710,943 B2
(45) Date of Patent: May 4, 2010

(54) SYNCHRONIZING VIDEO/AUDIO DATA OF MOBILE COMMUNICATION TERMINAL

(75) Inventors: Kwang-Deok Seo, Gyeonggi-Do (KR); Chan-Woo Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 612 days.

(21) Appl. No.: 11/157,353

(22) Filed: Jun. 21, 2005

(65) Prior Publication Data

US 2005/0281246 A1   Dec. 22, 2005

(30) Foreign Application Priority Data

Jun. 22, 2004   (KR)   ....................... 10-2004-0046697

(51) Int. Cl.
*H04J 3/06* (2006.01)
(52) U.S. Cl. .................................... 370/350; 348/14.01
(58) Field of Classification Search ................. 370/350; 348/14.01
See application file for complete search history.

(56) References Cited

U.S. PATENT DOCUMENTS

| 2002/0002708 A1* | 1/2002 | Arye ........................... 725/95 |
| 2007/0206682 A1* | 9/2007 | Hamilton et al. ....... 375/240.25 |

* cited by examiner

*Primary Examiner*—Dwayne Bost
*Assistant Examiner*—Amancio Gonzalez
(74) *Attorney, Agent, or Firm*—Lee, Hong, Degerman, Kang & Waimey

(57) ABSTRACT

The present invention relates to a method for shortening the time to synchronize video/audio data in a mobile communication terminal. The method comprises receiving video/audio data in the mobile communication terminal through a set session, determining whether a current sampling rate of the received video/audio data is consistent with a previous sampling rate of the received video/audio data, calculating a standard time according to the determination, and synchronizing the video/audio data based on the calculated standard time. The standard time is calculated using a preset ratio if the current sampling rate is consistent with the previous sampling rate. However, the standard time is calculated using a variation value of a real time protocol (RTP) time stamp and a variation value of a network time protocol (NTP) time stamp if the current sampling rate is not consistent with the previous sampling rate.

16 Claims, 6 Drawing Sheets

SYNCHRONIZING VIDEO/AUDIO DATA OF MOBILE COMMUNICATION TERMINAL

CROSS-REFERENCE TO RELATED APPLICATIONS

Pursuant to 35 U.S.C. §119(a), this application claims the benefit of earlier filing date and right of priority to Korean Application No. 2004-0046697, filed on Jun. 22, 2004, the contents of which is hereby incorporated by reference herein in its entirety.

FIELD OF THE INVENTION

The present invention relates to a mobile communication terminal, and more particularly, to a method for synchronizing video/audio data of a mobile communication terminal capable of reducing the time to synchronize video/audio data.

BACKGROUND OF THE INVENTION

Mobile communication terminals have developed such that they are capable of more than just a simple wireless communication function. For example, a camera function and a multimedia replaying function can be provided. The camera function and the multimedia replaying function have gained popularity simultaneously with developments in display unit technology for the mobile communication terminal and high-speed communication techniques. Specific developments include high-resolution digital cameras and mobile terminals having color LCD screens.

Streaming video/audio data decoded by an MPEG-4 codec (coder and decoder) or video/audio data inputted by a camera may be displayed on the color LCD screen of the mobile terminal. Currently, a mobile communication terminal capable of real-time transmission and reception of video/audio data inputted by a camera for video telephony is being actively researched.

Because the mobile communication terminal receives video data through a video real time protocol (RTP) session and receives audio data through an audio RTP session, the received video/audio data must be synchronized with each other. The transmission of video/audio data of a mobile communication terminal in accordance with the related art will be explained with reference to FIG. 1.

Figure 1:
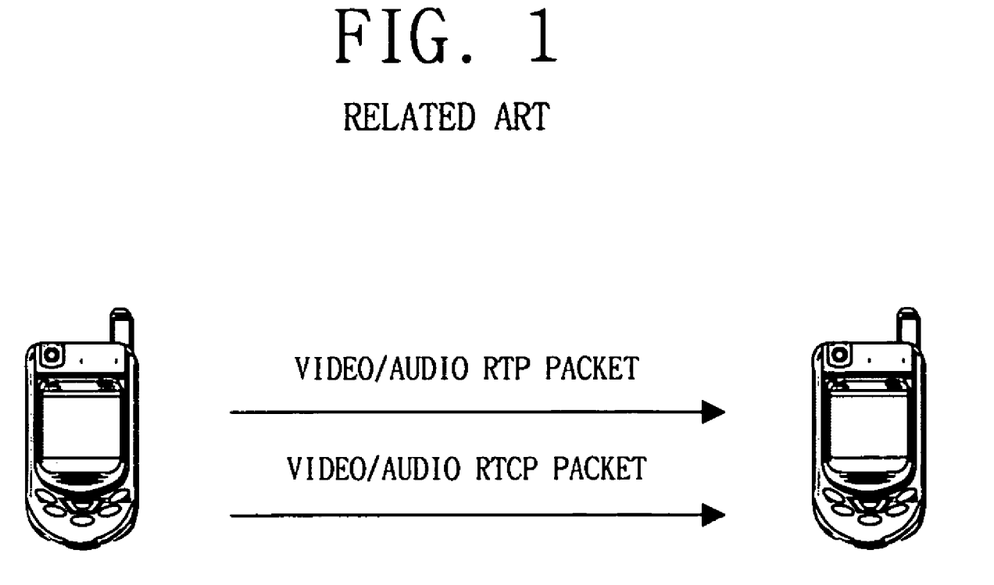
FIG. 1 illustrates a method for transmitting video/audio data of a mobile communication terminal in accordance with the related art.

FIG. 1 illustrates a method for transmitting video/audio data of a mobile communication terminal in accordance with the related art. As shown in FIG. 1, a mobile communication terminal sets a video/audio RTP session and transmits a video/audio RTP packet through the video/audio RTP session. Also, the mobile communication terminal sets a video/audio RTP control protocol (RTCP) session for controlling the video/audio RTP packet, and transmits a video/audio RTCP packet through the RTCP session. The video/audio RTCP packet denotes a video/audio RTCP sender report (SR) packet.

Figure 2:
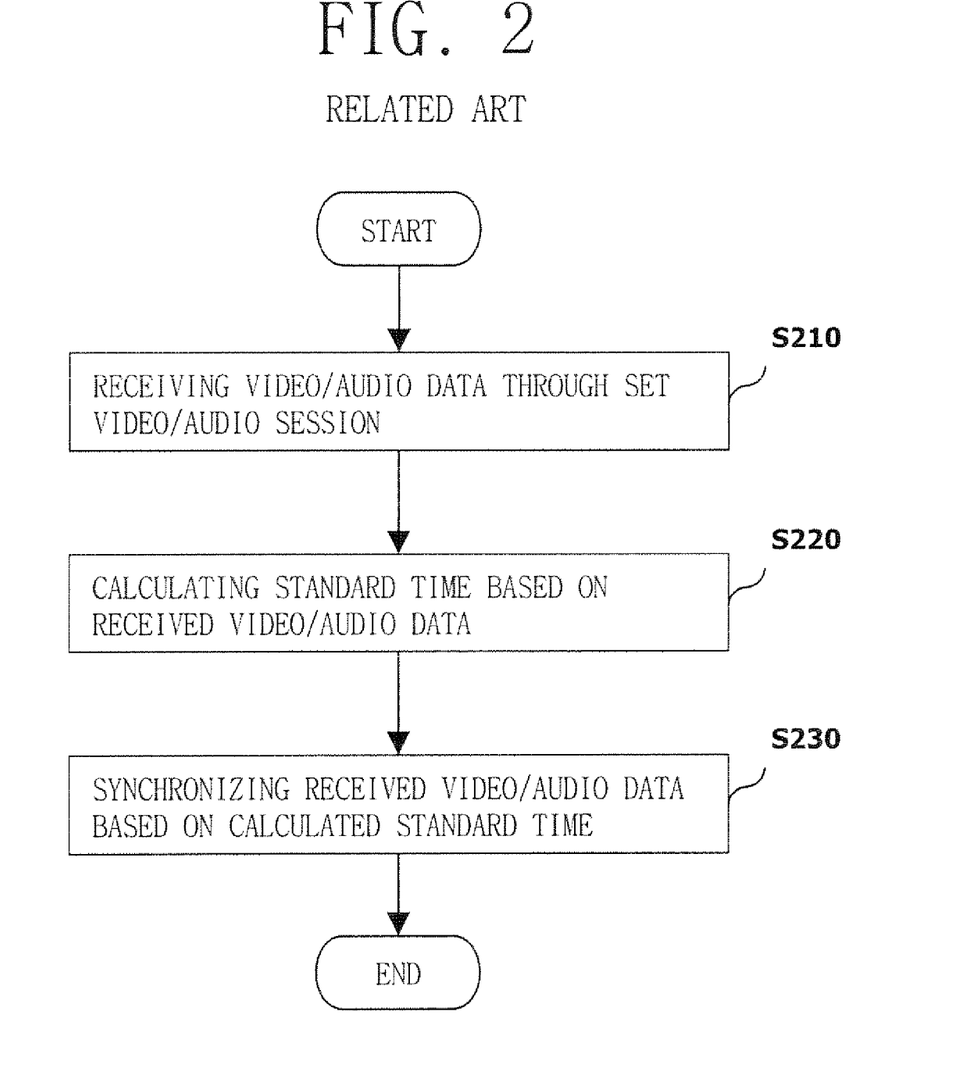
FIG. 2 is a flowchart illustrating a method for synchronizing video/audio data of a mobile communication terminal in accordance with the related art.

A method for synchronizing video/audio data of a mobile communication terminal in accordance with the related art will be explained with reference to FIG. 2. As shown in FIG. 2, a method for synchronizing video/audio data of a mobile communication terminal comprises receiving video/audio data through a set session (S210), calculating a standard time based on the received video/audio data (S220), and synchronizing the received video/audio data based on the calculated standard time (S230).

The method for synchronizing video/audio data of a mobile communication terminal in accordance with the related art will be explained in more detail.

The mobile communication terminal receives a video RTP packet through a video/audio RTP session and receives a video RTCP packet through a video/audio RTCP session. Also, the mobile communication terminal receives an audio RTP packet through the video/audio RTP session and receives an audio RTCP packet through the video/audio RTCP session (S210). A method for transmitting the received RTP packet and the RTCP packet will be explained with reference to FIG. 3.

Figure 3:
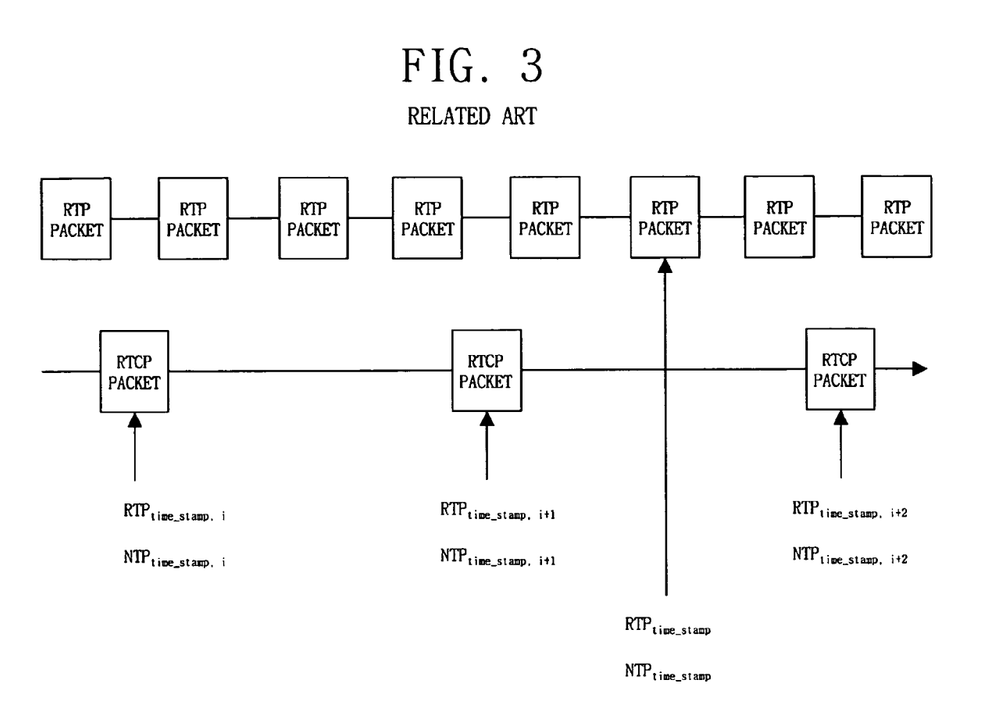
FIG. 3 is a block diagram illustrating the receipt of an RTP packet and an RTCP packet in accordance with the related art.

FIG. 3 is a block diagram illustrating the receipt of an RTP packet and an RTCP packet in accordance with the related art. As shown in FIG. 3, the mobile communication terminal periodically receives the RTCP packet for controlling the RTP packet, and calculates a standard time of the received RTP packet. The standard time provides information on absolute time since an RTP time stamp is a relative time that can be used for a single RTP session. Also, a network time protocol (NTP) time stamp may be used to calculate the standard time. Accordingly, the standard time is used for synchronizing the video/audio data based on the RTP time stamp and the NTP time stamp of the $(i+1)^{th}$ RTCP packet and the previously received $i^{th}$ RTCP packet.

The mobile communication terminal calculates a standard time for synchronizing the received video/audio data based on the received video/audio RTCP packet by the following formula (1) (S220).

$$NTP_{\text{time\_stamp}} = NTP_{\text{time\_stamp},i+1} + \frac{\Delta NTP_{\text{time\_stamp}}}{\Delta RTP_{\text{time\_stamp}}}(RTP_{\text{time\_stamp}} - RTP_{\text{time\_stamp},i+1}). \quad (1)$$

The $RTP_{time\_stamp,\ i}$ and $RTP_{time\_stamp,\ i+1}$ respectively denote an RTP time stamp included in the $i^{th}$ RTCP packet and an RTP time stamp included in the $(i+1)^{th}$ RTCP packet. The $NTP_{time\_stamp,\ i}$ and $NTP_{time\_stamp,\ i+1}$ respectively denote an NTP time stamp included in the $i^{th}$ RTCP packet and an NTP time stamp included in the $(i+1)^{th}$ RTCP packet.

A variation value of the network time protocol (NTP) time stamp and a variation value of the real time protocol (RTP) time stamp are calculated by the following formulas (2) and (3).

$$\Delta NTP_{time\_stamp} = NTP_{time\_stamp,\ i+1} - NTP_{time\_stamp,\ i} \quad (2).$$

$$\Delta RTP_{time\_stamp} = RTP_{time\_stamp,\ i+1} - RTP_{time\_stamp,\ i} \quad (3).$$

The mobile communication terminal can synchronize the received video/audio data based on the calculated standard time (S230).

However, in the method for synchronizing video/audio data of a mobile communication terminal in accordance with the related art, a standard time has to be calculated whenever video/audio data is received. Accordingly, even if the variation value of the NTP time stamp and the variation value of the RTP time stamp are constant, the time for synchronizing the video/audio data is not shortened.

SUMMARY OF THE INVENTION

The present invention is related to a method for shortening the time to synchronize video/audio data in a mobile communication terminal of a mobile communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for synchronizing video/audio data of a mobile communication terminal, the method comprising receiving video/audio data in the mobile communication terminal through a set session, determining whether a current sampling rate of the received video/audio data is consistent with a previous sampling rate of the received video/audio data, calculating a standard time according to the determination, and synchronizing the video/audio data based on the calculated standard time.

The standard time is calculated based on a preset ratio if it is determined that the current sampling rate is consistent with the previous sampling rate. The preset ratio is obtained by dividing a variation value of a network time protocol (NTP) time stamp by a variation value of a real time protocol (RTP) time stamp.

The variation value of the NTP time stamp is obtained by a formula of $NTP_{time\_stamp,\ i+1} - NTP_{time\_stamp,\ i}$. Preferably, the variation value of the NTP time stamp is $2^{32}$ corresponding to one second.

The variation value of the RTP time stamp is obtained by a formula of $RTP_{time\_stamp,\ i+1} - RTP_{time\_stamp,\ i}$. Preferably, the variation value of the RTP time stamp is the current sampling rate.

The standard time is an absolute time for synchronizing the video/audio data. Preferably, the standard time is obtained by a formula of $$NTP_{\text{time\_stamp},i+1} + \frac{\Delta NTP_{\text{time\_stamp}}}{\Delta RTP_{\text{time\_stamp}}}(RTP_{\text{time\_stamp}} - RTP_{\text{time\_stamp},i+1}).$$

Preferably, the standard time is a value of 32 bits.

In one aspect, a value of a network time protocol (NTP) time stamp is scaled by the mobile communication terminal.

In another aspect of the present invention, the standard time is calculated based on a variation value of a real time protocol (RTP) time stamp and a variation value of a network time protocol (NTP) time stamp if it is determined that the current sampling rate is not consistent with the previous sampling rate.

The variation value of the RTP time stamp is obtained by a formula of $RTP_{time\_stamp,\ i+1} - RTP_{time\_stamp,\ i}$. The variation value of the NTP time stamp is obtained by a formula of $NTP_{time\_stamp,\ i+1} - NTP_{time\_stamp,\ i}$.

The standard time is an absolute time for synchronizing the video/audio data. Preferably, the standard time is obtained by a formula of $$NTP_{\text{time\_stamp},i+1} + \frac{\Delta NTP_{\text{time\_stamp}}}{\Delta RTP_{\text{time\_stamp}}}(RTP_{\text{time\_stamp}} - RTP_{\text{time\_stamp},i+1}).$$

Preferably, the standard time is a value of 32 bits.

In a further aspect, a value of a network time protocol (NTP) time stamp is scaled by the mobile communication terminal.

In another embodiment of the present invention, a method for synchronizing video/audio data of a mobile communication terminal comprises receiving video/audio data in the mobile communication terminal through a set session, determining whether a current sampling rate of the received video/audio data is consistent with a previous sampling rate of the received video/audio data, calculating a standard time according to the determination, and synchronizing the video/audio data based on the calculated standard time, wherein the standard time is calculated based on a preset ratio if it is determined that the current sampling rate is consistent with the previous sampling rate, wherein the standard time is calculated based on a variation value of a real time protocol (RTP) time stamp and a variation value of a network time protocol (NTP) time stamp if it is determined that the current sampling rate is not consistent with the previous sampling rate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a method for synchronizing video/audio data of a mobile communication terminal capable of shortening the time to synchronize the video/audio data.

Reference will now be made in detail to the preferred embodiments of the present invention, examples of which are illustrated in the accompanying drawings.

A method for synchronizing video/audio data of a mobile communication terminal capable of shortening the time for synchronizing the video/audio data will be explained. Preferably, the method calculates a standard time for synchronizing the video/audio data by applying a preset sampling rate of the video/audio data.

Figure 4:
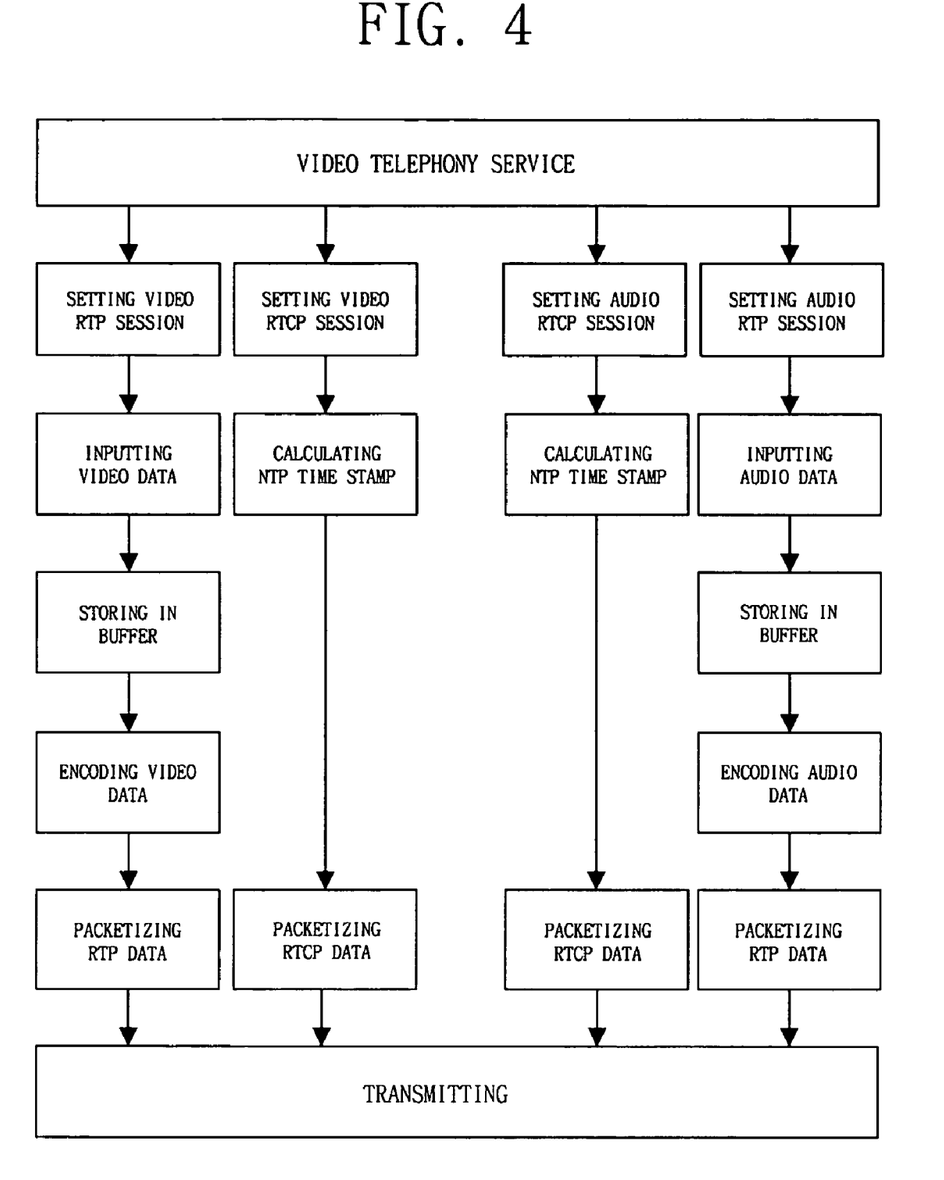
FIG. 4 is a block diagram illustrating a method for transmitting video/audio data of a mobile communication terminal in accordance with one embodiment of the present invention.

FIG. 4 is a block diagram illustrating a method for transmitting video/audio data of a mobile communication terminal in accordance with one embodiment of the present invention. As shown in FIG. 4, a mobile communication terminal according to the present invention sets video/audio real time protocol (RTP) sessions for transmitting video/audio data, and transmits video/audio data via video/audio RTP packets during the video/audio RTP sessions. Also, the mobile communication terminal sets video/audio RTP control protocol (RTCP) sessions for controlling the video/audio RTP packets, and transmits video/audio RTCP packets for controlling the video/audio RTP packets through the RTCP sessions. The video/audio RTCP packet denotes a video/audio RTCP sender report (SR) packet.

Since the video/audio data is transmitted through the set video/audio RTP session in a packetized state, a receiving side mobile communication terminal depacketizes the transmitted video/audio RTP packets and synchronizes the depacketized video/audio data. A method for receiving the video/audio data of the mobile communication terminal according to the present invention will be explained with reference to FIG. 5.

Figure 5:
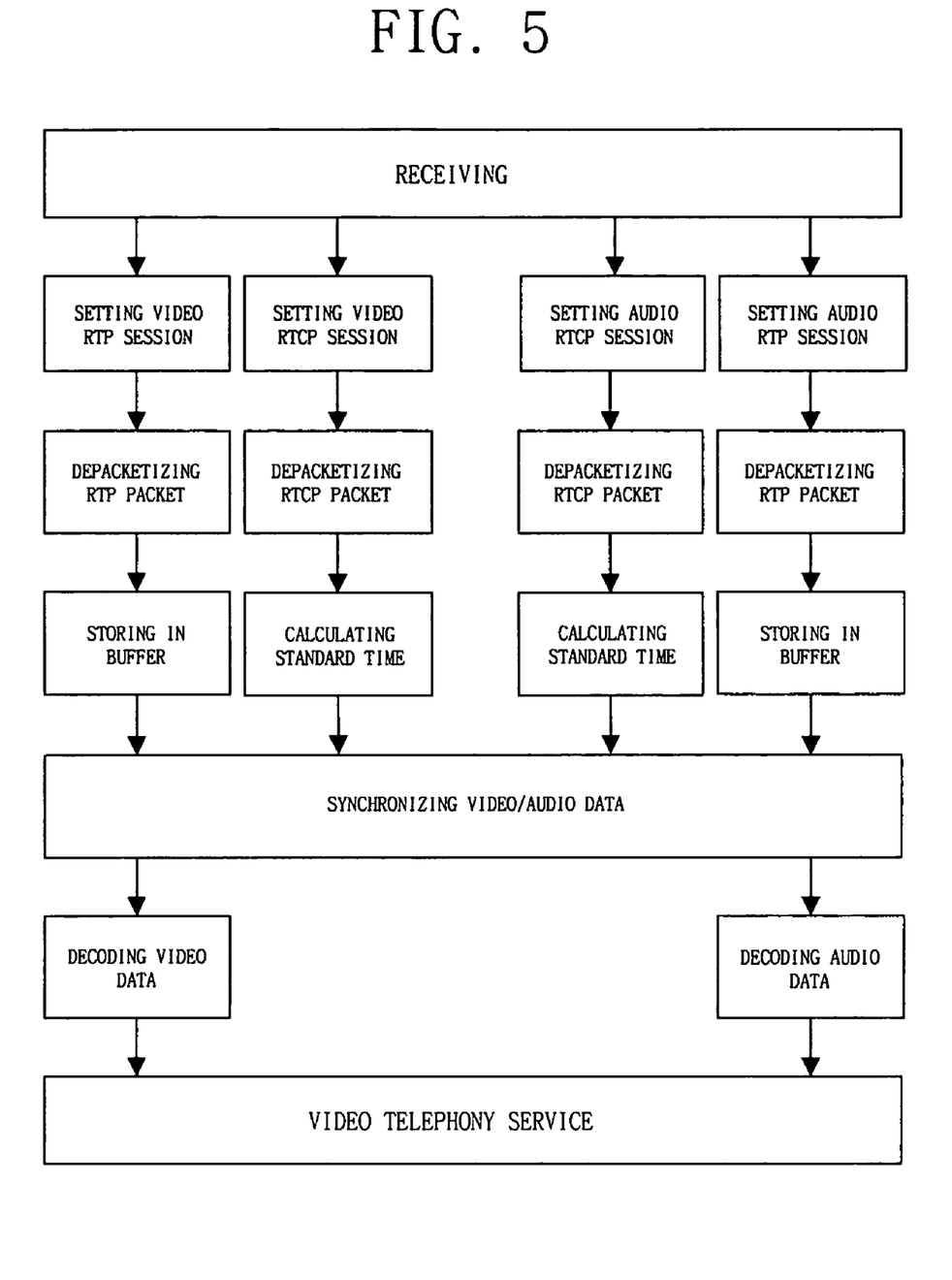
FIG. 5 is a block diagram illustrating a method for receiving video/audio data of a mobile communication terminal in accordance with one embodiment of the present invention.

FIG. 5 is a block diagram illustrating a method for receiving video/audio data of the mobile communication terminal in accordance with one embodiment of the present invention. As shown in FIG. 5, the mobile communication terminal according to the present invention depacketizes received video/audio RTP packets into video/audio data, and calculates a standard time for synchronizing the depacketized video/audio data, thereby synchronizing the depacketized video/audio data based on the calculated standard time.

A method for synchronizing video/audio data of the mobile communication terminal according to the present invention will be explained in more detail as follows. The mobile communication terminal receives a video RTP packet through a video RTP session and receives a video RTCP packet through a video RTCP session. Also, the mobile communication terminal receives an audio RTP packet through an audio RTP session and receives an audio RTCP packet through an audio RTCP session. The video/audio RTCP packet denotes a video/audio RTCP send report (SR) packet.

The mobile communication terminal depacketizes the received video/audio RTP packets into video/audio data and stores the data into a buffer. The mobile communication terminal synchronizes the depacketized video/audio data on the basis of an RTP time stamp value and an NTP time stamp value included in the received video/audio RTCP packets. The method for synchronizing the video/audio data will be explained with reference to FIG. 6.

Figure 6:
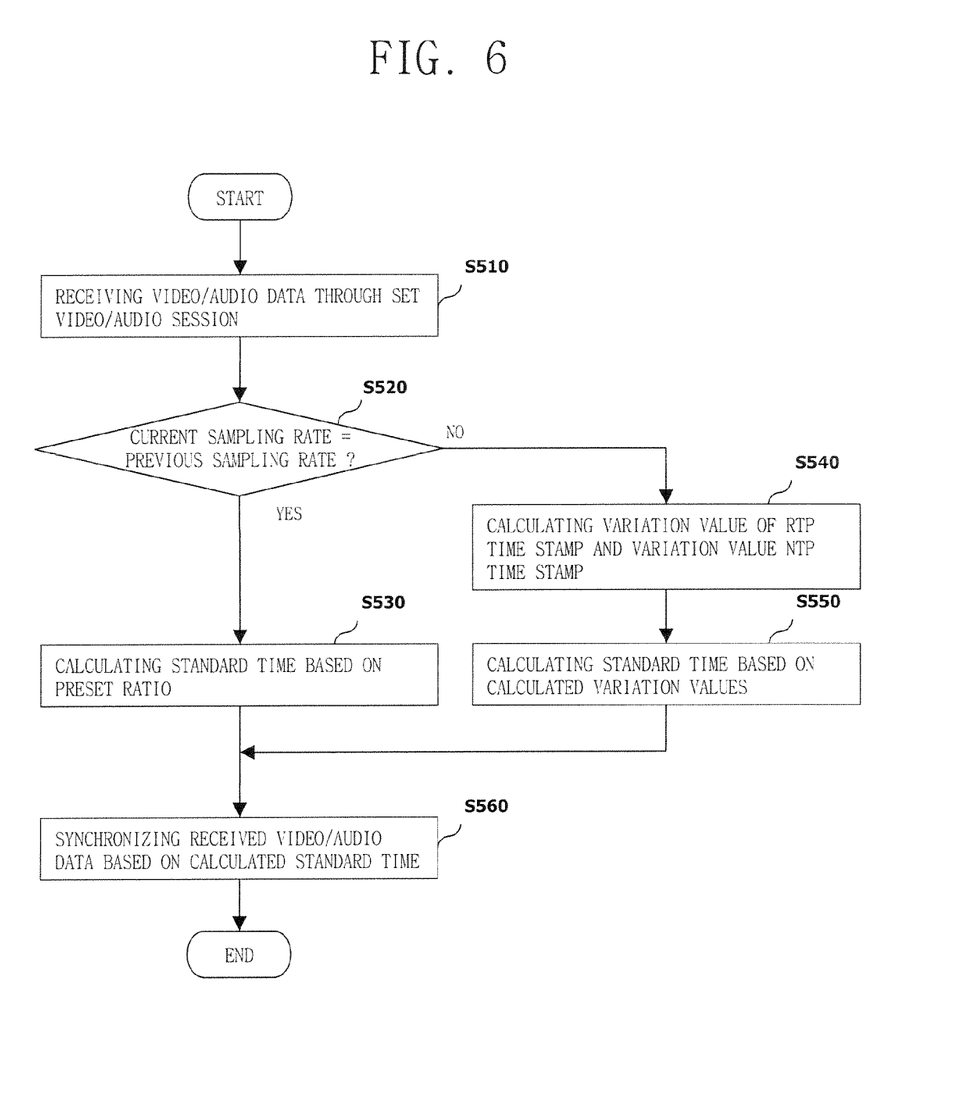
FIG. 6 is a flowchart illustrating a method for synchronizing video/audio data of a mobile communication terminal in accordance with one embodiment of the present invention.

FIG. 6 is a flowchart illustrating a method for synchronizing video/audio data of a mobile communication terminal in accordance with one embodiment of the present invention. As shown in FIG. 6, the method for synchronizing video/audio data of a mobile communication terminal according to the present invention comprises receiving video/audio data through a set session (S510), determining whether a current sampling rate of the received video/audio data is consistent with a previous sampling rate of the received video/audio data (S520), calculating a standard time based on a preset ratio when the current sampling rate of the received video/audio data is consistent with the previous sampling rate (S530), and synchronizing the video/audio data based on the calculated standard time (S560).

When the current sampling rate of the received video/audio data is not consistent with the previous sampling rate, the mobile communication terminal calculates a variation value of an RTP time stamp and a variation value of an NTP time stamp (S540), and calculates a standard time based on the calculated variation value of the RTP time stamp and the variation value of the NTP time stamp (S550).

The method for synchronizing video/audio data of a mobile communication terminal according to the present invention will be explained in more detail as follows.

The mobile communication terminal receives a video RTP packet through a set video RTP session, receives a video RTCP packet through a set video RTCP session, receives an audio RTP packet through a set audio RTP session, and receives an audio RTCP packet through a set audio RTCP session (S510).

The mobile communication terminal determines whether a current sampling rate of the video/audio data is consistent with a previous sampling rate from the received video/audio RTCP packets (S520). That is, when the current sampling rate of the received video/audio data is not consistent with the previous sampling rate, the mobile communication terminal calculates the variation value of the RTP time stamp and the variation value of the NTP time stamp as in the related art method, according to formulas (2) and (3) (S540), and calculates a standard time for synchronizing the video/audio data based on the calculated variation value of the RTP time stamp and the variation value of the NTP time stamp as in the related art method, according to formula (1) (S550).

When the current sampling rate of the received video/audio data is consistent with the previous sampling rate, the mobile communication terminal calculates a standard time based on a preset ratio (S530) instead using formulas (1), (2) and (3) of the related art methods. The preset ratio is obtained by dividing the variation value of the NTP time stamp by the variation value of the RTP time stamp, $$\frac{\Delta NTP_{\text{time\_stamp}}}{\Delta RTP_{\text{time\_stamp}}}.$$

For example, when a sampling rate of the video data is 90 kHz and a sampling rate of the audio data is 8 kHz, a preset ratio for the video data and a preset ratio for the audio data are calculated by the following formulas (4) and (5).

$$\frac{\Delta NTP_{\text{time\_stamp}}}{\Delta RTP_{\text{time\_stamp}}} = \frac{2^{32}}{90k} \approx 47721.8588444 \approx 47722. \quad (4)$$

$$\frac{\Delta NTP_{\text{time\_stamp}}}{\Delta RTP_{\text{time\_stamp}}} = \frac{2^{32}}{8k} \approx 536870.912 \approx 536870. \quad (5)$$

The mobile communication terminal calculates a standard time for synchronizing the video/audio data based on the preset ratio by the following formulas (6) and (7).

$$NTP_{time\_stamp} = NTP_{time\_stamp,\,i+1} + 47722 \cdot (RTP_{time\_stamp} - RTP_{time\_stamp,\,i+1}) \quad (6).$$

$$NTP_{time\_stamp} = NTP_{time\_stamp,\,i+1} + 536870 \cdot (RTP_{time\_stamp} - RTP_{time\_stamp,\,i+1}) \quad (7).$$

The mobile communication terminal synchronizes the video/audio data based on the calculated standard time (S560). Since the mobile communication terminal applies the preset ratio whenever the video/audio packets are received, the ratio, $$\frac{\Delta NTP_{\text{time\_stamp}}}{\Delta RTP_{\text{time\_stamp}}}$$

does not need to be calculated each time. Accordingly, the time for calculating the standard time for synchronizing the video/audio data can be shortened.

Furthermore, in order to shorten the time for calculating the standard time for synchronizing the video/audio data, the mobile communication terminal may scale a value of the NTP time stamp of 64 bits into 32 bits, the same as a value of the RTP time stamp of 32 bits. Preferably, the value of the NTP time stamp of 64 bits can be scaled into a value of 32 bits by discarding values of the uppermost 10 bits and values of the lowermost 22 bits. The mobile communication terminal may be implemented without repeating the 64-bit calculation or 32-bit calculation, thereby simplifying the structure and reducing the amount of calculation.

The mobile communication terminal stores the depacketized video/audio data in the buffer and decodes the stored video/audio data, thereby displaying the decoded video/audio data on a display device such as a liquid crystal display (LCD), for example.

As aforementioned, in the method for synchronizing video/audio data of a mobile communication terminal according to the present invention, a standard time for synchronizing video/audio data is calculated by applying a preset sampling rate of the video/audio data. Accordingly, the time for synchronizing the video/audio data is shortened.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for synchronizing video data with audio data in a mobile communication terminal, the method comprising:
   receiving video data and audio data in the mobile communication terminal through a set session;
   determining whether a current sampling rate of the received video data and audio data is consistent with a previous sampling rate of the received video data and audio data;
   calculating a standard time according to the determination; and
   synchronizing the video data with the audio data based on the calculated standard time,
   wherein the standard time is calculated based on a preset ratio if it is determined that the current sampling rate is consistent with the previous sampling rate,
   wherein the preset ratio is obtained by dividing a variation value of a network time protocol (NTP) time stamp by a variation value of a real time protocol (RTP) time stamp, and
   wherein the variation value of the NTP time stamp is obtained according to the formula:

$$NTP_{time\_stamp,\,i+1} - NTP_{time\_stamp,\,i},$$

where $NTP_{time\_stamp,\,i+1}$ and $NTP_{time\_stamp,\,i+1}$ respectively are an NTP time stamp included in an $i^{th}$ RTCP packet and an NTP time stamp included in an $(i+1)^{th}$ RTCP packet.

2. The method of claim 1, wherein the variation value of the NTP time stamp is $2^{32}$ corresponding to one second.

3. The method of claim 1, wherein the variation value of the RTP time stamp is obtained by a formula of $RTP_{time\_stamp,\,i+1} - RTP_{time\_stamp,\,i}$, wherein the $RTP_{time\_stamp,\,i}$ and $RTP_{time\_stamp,\,i+1}$ respectively are an RTP time stamp included in an $i^{th}$ RTCP packet and an RTP time stamp included in an $(i+1)^{th}$ RTCP packet.

4. The method of claim 3, wherein the variation value of the RTP time stamp is the current sampling rate.

5. The method of claim 1, wherein the standard time is an absolute time for synchronizing the video data with the audio data.

6. The method of claim 1, wherein the standard time is obtained according to the formula:

$$NTP_{\text{time\_stamp},i+1} + \frac{\Delta NTP_{\text{time\_stamp}}}{\Delta RTP_{\text{time\_stamp}}}(RTP_{\text{time\_stamp}} - RTP_{\text{time\_stamp},i+1}),$$

wherein the $\Delta NTP_{time\_stamp}$ is a variation value of a network time protocol (NTP) time stamp, the $\Delta RTP_{time\_stamp}$ is a variation value of a real time protocol (RTP) time stamp, the $NTP_{time\_stamp,\,i+1}$ is an NTP time stamp included in an $(i+1)^{th}$ RTCP packet and the $RTP_{time\_stamp,\,i}$ and $RTP_{time\_stamp,\,i+1}$ respectively are an RTP time stamp included in an $i^{th}$ RTCP packet and an RTP time stamp included in an $(i+1)^{th}$ RTCP packet.

7. The method of claim 6, wherein the standard time is a value of 32 bits.

8. The method of claim 1, wherein a value of a network time protocol (NTP) time stamp is scaled by the mobile communication terminal.

9. The method of claim 1, wherein the standard time is calculated based on a variation value of a real time protocol (RTP) time stamp and a variation value of a network time protocol (NTP) time stamp if it is determined that the current sampling rate is not consistent with the previous sampling rate.

10. The method of claim 9, wherein the variation value of the RTP time stamp is obtained by a formula of $RTP_{time\_stamp,\,i+1} - RTP_{time\_stamp,\,i}$, wherein the $RTP_{time\_stamp,\,i}$ and $RTP_{time\_stamp,\,i+1}$ respectively are an RTP time stamp included in an $i^{th}$ RTCP packet and an RTP time stamp included in an $(i+1)^{th}$ RTCP packet.

11. The method of claim 9, wherein the variation value of the NTP time stamp is obtained by a formula of $NTP_{time\_stamp,\,i+1} - NTP_{time\_stamp,\,i}$, wherein the $NTP_{time\_stamp,\,i}$ and $NTP_{time\_stamp,\,i+1}$ respectively are an NTP time stamp included in an $i^{th}$ RTCP packet and an NTP time stamp included in an $(i+1)^{th}$ RTCP packet.

12. The method of claim 9, wherein the standard time is an absolute time for synchronizing the video data with the audio data.

13. The method of claim 9, wherein the standard time is obtained by a formula of $$NTP_{\text{time\_stamp},i+1} + \frac{\Delta NTP_{\text{time\_stamp}}}{\Delta RTP_{\text{time\_stamp}}}(RTP_{\text{time\_stamp}} - RTP_{\text{time\_stamp},i+1}),$$

wherein the $\Delta NTP_{time\_stamp}$ is a variation value of a network time protocol (NTP) time stamp, the $\Delta RTP_{time\_stamp}$ is a variation value of a real time protocol (RTP) time stamp, the $NTP_{time\_stamp, i+1}$ is an NTP time stamp included in an $(i+1)^{th}$ RTCP packet and the $RTP_{time\_stamp, i}$ and $RTP_{time\_stamp, i+1}$ respectively are an RTP time stamp included in an $i^{th}$ RTCP packet and an RTP time stamp included in an $(i+1)^{th}$ RTCP packet.

14. The method of claim 13, wherein the standard time is a value of 32 bits.

15. The method of claim 9, wherein a value of a network time protocol (NTP) time stamp is scaled by the mobile communication terminal.

16. A method for synchronizing video data with audio data of a mobile communication terminal, the method comprising:

receiving video data and audio data in the mobile communication terminal through a set session;

determining whether a current sampling rate of the received video data and audio data is consistent with a previous sampling rate of the received video data and audio data;

calculating a standard time according to the determination; and synchronizing the video data with the audio data based on the calculated standard time, wherein the standard time is calculated based on a variation value of a real time protocol (RTP) time stamp and a variation value of a network time protocol (NTP) time stamp if it is determined that the current sampling rate is not consistent with the previous sampling rate, and wherein the standard time is calculated based on a preset ratio if it is determined that the current sampling rate is consistent with the previous sampling rate, wherein the preset ratio is obtained by dividing a variation value of a network time protocol (NTP) time stamp by a variation value of a real time protocol (RTP) time stamp, and wherein the variation value of the NTP time stamp is obtained according to the formula:

$$NTP_{time\_stamp, i+1} - NTP_{time\_stamp, i},$$

where $NTP_{time\_stamp, i}$ and $NTP_{time\_stamp, i+1}$ respectively are an NTP time stamp included in an $i^{th}$ RTCP packet and an NTP time stamp included in an $(i+1)^{th}$ RTCP packet.

* * * * *